(12) United States Patent
Wehrle et al.

(10) Patent No.: US 9,167,846 B2
(45) Date of Patent: Oct. 27, 2015

(54) EXTRUDER

(75) Inventors: Karina Wehrle, Slough (GB);
Christopher Abbott, Slough (GB);
Kamyar Nabavi, Cleveland, OH (US);
Peter Gibbs, Slough (GB)

(73) Assignee: Mars, Incorporated, McLean, VA (US)

( * ) Notice: Subject to any disclaimer, the term of this patent is extended or adjusted under 35 U.S.C. 154(b) by 1501 days.

(21) Appl. No.: 12/667,210

(22) PCT Filed: Jul. 3, 2008

(86) PCT No.: PCT/GB2008/002316
§ 371 (c)(1),
(2), (4) Date: Nov. 1, 2010

(87) PCT Pub. No.: WO2009/004355
PCT Pub. Date: Jan. 8, 2009

(65) Prior Publication Data
US 2011/0059198 A1    Mar. 10, 2011

(30) Foreign Application Priority Data

Jul. 3, 2007 (GB) .................................. 0712872.1

(51) Int. Cl.
| B29C 47/38 | (2006.01) |
| B29C 47/76 | (2006.01) |
| A23P 1/12 | (2006.01) |
| A23G 1/20 | (2006.01) |
| A23G 3/02 | (2006.01) |
| B29C 47/00 | (2006.01) |
| B29C 47/60 | (2006.01) |

(52) U.S. Cl.
CPC . *A23P 1/12* (2013.01); *A23G 1/202* (2013.01);
*A23G 3/0242* (2013.01); *B29C 47/0021*
(2013.01); *B29C 47/60* (2013.01); *B29C
47/6025* (2013.01); *B29C 47/767* (2013.01);
*B29C 2791/006* (2013.01)

(58) Field of Classification Search
CPC  B29C 47/60; B29C 47/767; B29C 2791/006;
B29C 47/766; B29C 47/6025
USPC ............................ 366/77, 79, 76.93, 75, 76.1
See application file for complete search history.

(56) References Cited

U.S. PATENT DOCUMENTS

| 3,799,234 | A | * | 3/1974 | Skidmore | ...................... 425/203 |
| 3,917,507 | A | * | 11/1975 | Skidmore | ....................... 366/75 |
| 3,985,348 | A | * | 10/1976 | Skidmore | ....................... 366/75 |
| 4,908,104 | A | * | 3/1990 | Loomans et al. | ............... 201/25 |

(Continued)

FOREIGN PATENT DOCUMENTS

| DE | 1 274 907 | 5/1972 |
| DE | 1 521 624 | 8/1978 |

(Continued)

*Primary Examiner* — Tony G Soohoo
(74) *Attorney, Agent, or Firm* — Jason O'Leary; KSJLAW, LLC

(57) ABSTRACT

An extruder 10 comprises a barrel 12 and a screw 24 mounted in the barrel for rotation. The screw comprises screw threads 26a, 26b, 26c. The barrel has an inlet funnel 22 toward one end for material to be extruded and a die plate 18 with openings 20 at the other end and an air inlet port 28 toward one end of the barrel and an air outlet port 30 toward the other end. The screw threads are such that material 34 in the barrel is moved more quickly along the portion of the barrel between the air inlet port and the air outlet port than upstream of that portion. The air outlet is connected to a pump 32 so that there is a pressure difference between the air inlet and the air outlet.

4 Claims, 2 Drawing Sheets

(56) References Cited

U.S. PATENT DOCUMENTS

| | | | |
|---|---|---|---|
| 5,417,992 A | 5/1995 | Rizvi et al. | 426/283 |
| 5,472,835 A * | 12/1995 | Bendle et al. | 366/75 |
| 5,490,725 A * | 2/1996 | Behrens et al. | 366/76.9 |
| 5,711,904 A * | 1/1998 | Eswaran et al. | 425/145 |
| 5,851,065 A | 12/1998 | Ikeda et al. | 266/76.6 |
| 5,895,683 A | 4/1999 | Crook et al. | |
| 6,312,148 B1 * | 11/2001 | Deal et al. | 366/75 |
| 2006/0034147 A1 | 2/2006 | Murakami et al. | 366/75 |

FOREIGN PATENT DOCUMENTS

| | | |
|---|---|---|
| DE | 43 10 966 A1 | 10/1994 |
| EP | 0 739 701 A2 | 10/1996 |

* cited by examiner

EXTRUDER

FIELD OF THE INVENTION

This invention relates to extruders. Extruders are used to force materials, usually plastic materials, through dies and are particularly useful when it is required to work or mix the material prior to extrusion.

DESCRIPTION OF RELATED ART

Extruders typically comprise a barrel within which rotates a close fitting screw. The screw is made up of screw elements, some of which are helical screw threads to move material through the barrel. Material is introduced into the barrel toward one end, moved along the barrel by the action of the screw and is forced out of the barrel through a nozzle or die at the other end. The rotating screw mixes and works the material in the barrel and compresses it to force it through the die or nozzle. The degree of mixing and work to which the material is subjected, the speed of movement of the material through the barrel and thus the residence time in the barrel and the pressure developed in the barrel can be controlled by the pitch of the screw thread elements, the speed of rotation of the screw and the rate of introduction of material into the barrel.

Extruded material may be treated after extrusion; for example, the material may be dried of water or other liquid. It would be advantageous were it possible to begin this treatment in the extruder. It is known to draw a vacuum on the extruder barrel, for example to flash evaporate liquids within the extruder. A vacuum is applied to the extruder barrel through a port provided in the barrel wall. However, some materials are temperature sensitive so that a sufficiently low boiling point of the liquid to be removed can only be reached at very low pressure. The extruder and its contents can be cooled, but this is inefficient and may still be inadequate to preserve the extruded contents.

SUMMARY OF THE INVENTION

According to the invention there is provided an extruder comprising: a barrel and a screw mounted in the barrel for rotation, the screw comprising screw elements and the barrel comprising: an inlet toward one end for material to be extruded and an outlet for the material toward the other end; and a fluid inlet and a fluid outlet in the barrel wall, the fluid inlet and the fluid outlet being separated along the barrel wall in the longitudinal direction thereof and the screw elements being such that material in the barrel is moved more quickly along the portion of the barrel between the fluid inlet and the fluid outlet than upstream of the said portion, one of the fluid inlet and the fluid outlet being connected to a pump so that there is a pressure difference between the fluid inlet and the fluid outlet. Preferably, the fluid outlet is closer to the material outlet than is the fluid inlet. The extruder may be a twin screw extruder.

Also according to the invention there is provided a method of extruding material comprising forcing material through an extruder barrel from a material inlet to a material outlet and additionally flowing a fluid through the extruder barrel from a fluid inlet to a fluid outlet.

The present invention provides a method and apparatus which allows drying, that is, partial or total removal of water or other liquid, or other treatment of material to take place in an extruder barrel without the need to subject the material to elevated temperature.

DETAILED DESCRIPTION OF THE INVENTION

Figure 1:
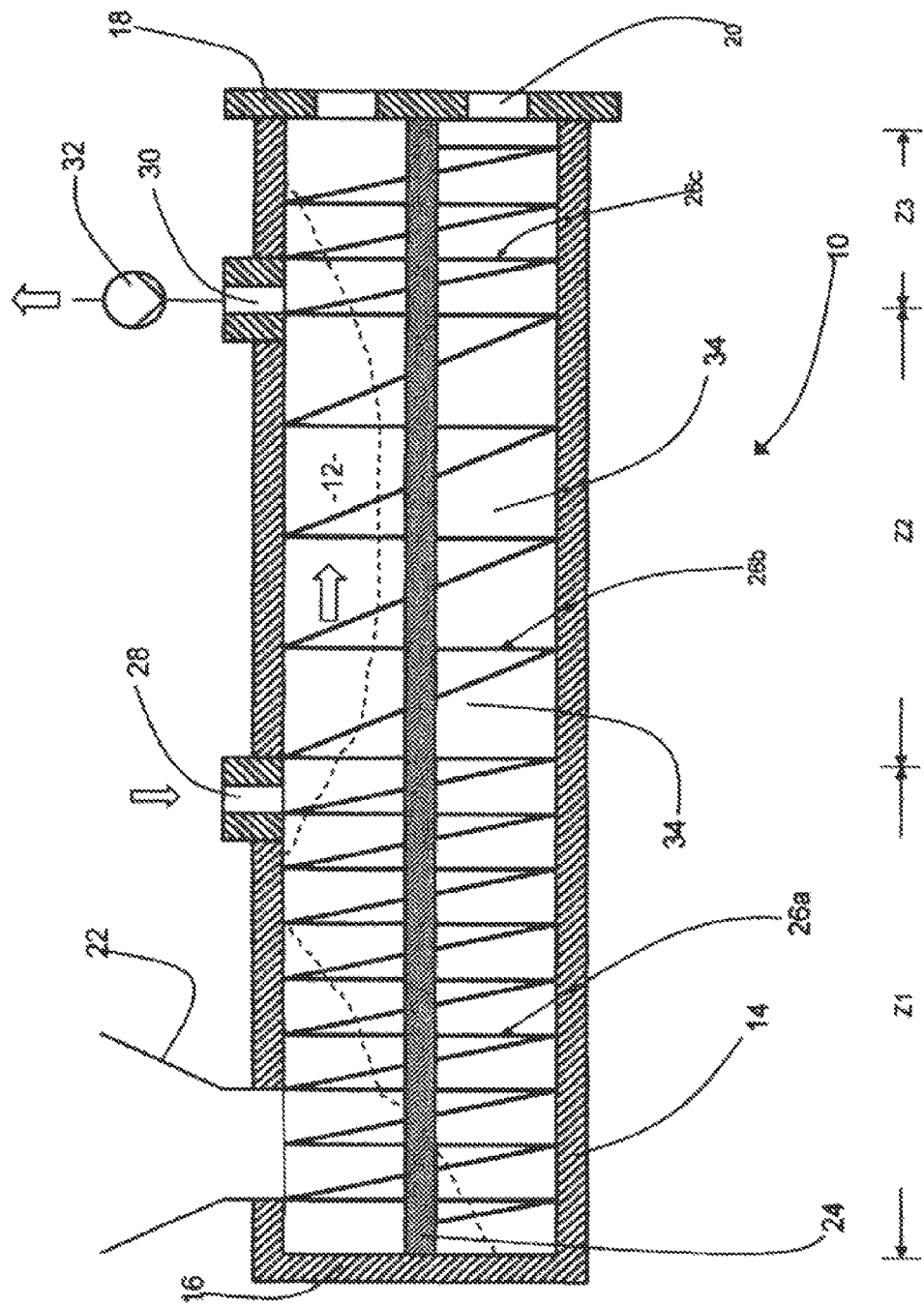
FIG. 1 is a schematic representation of a section through a preferred extruder apparatus of the invention.
Figure 2:
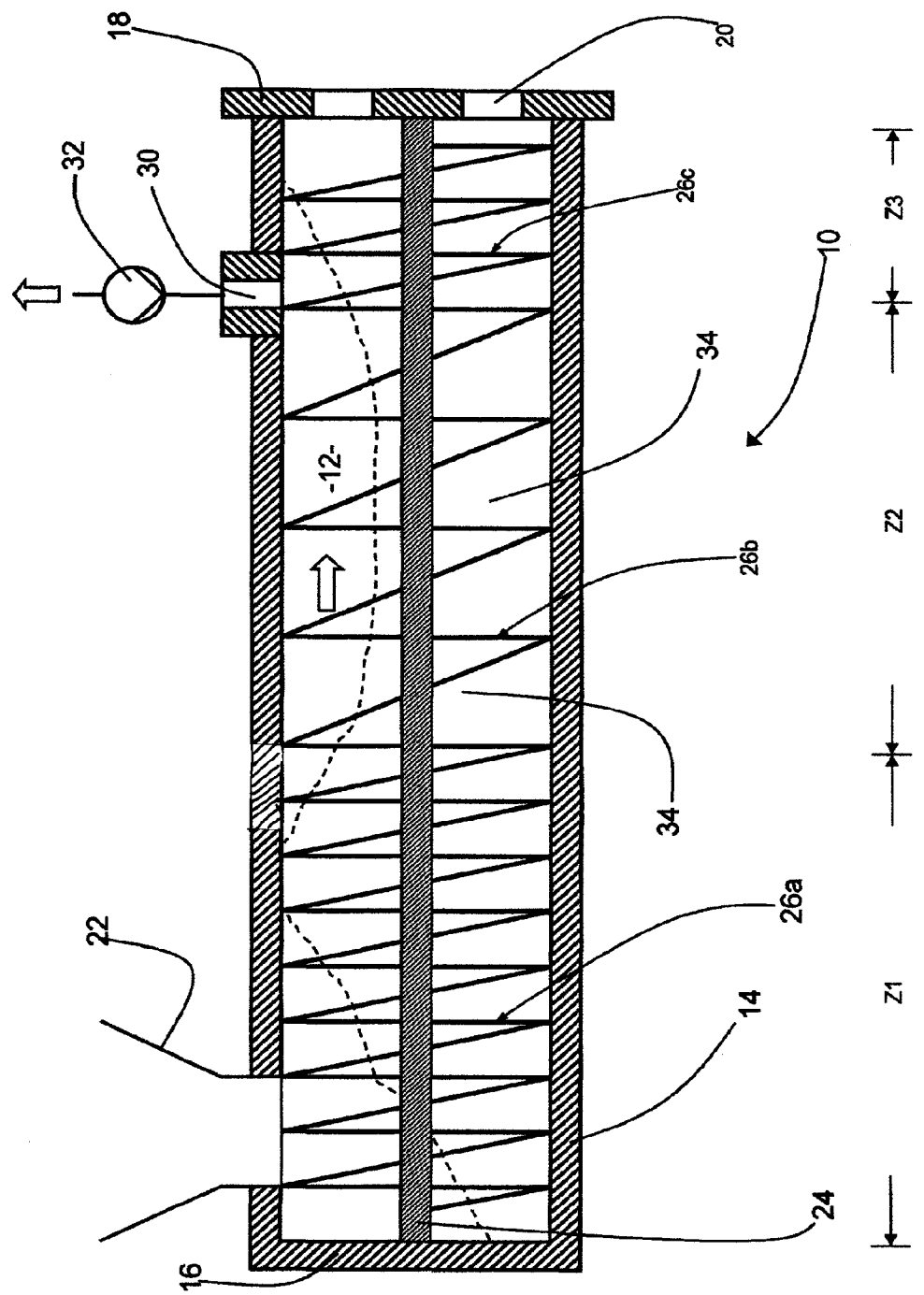
FIG. 2 is a schematic representation of a section through an extruder according to one embodiment.

The invention will be further described with reference to the drawing which shows schematically a section through a preferred extruder according to the invention.

The extruder 10 of the drawing includes a barrel 12 having a cylindrical side wall 14 and an end wall 16. The end of the barrel 12 opposite the end wall 16 is closed by a die plate 18 having openings 20 therethrough. Toward the opposite end of the barrel 12 from the die plate 18 is an inlet funnel 22 through the cylindrical side wall 14, through which material to be extruded can be introduced into the barrel.

A screw 24 having helical threads 26a, 26b, 26c is mounted longitudinally in the barrel 12 for rotation therein. The screw 24 is a tight fit in the barrel 12. The extruder 10 is shown as having a screw 24 composed entirely of screw thread elements. It may be useful to include other elements on the screw 24 to mix or otherwise manipulate the material being passed through the extruder.

An air inlet port 28 extends through the side wall 14 of the extruder barrel between the inlet funnel 22 and the die plate 18. An air outlet port 30 in communication with a pump 32 extends through the barrel side wall 14 adjacent the die plate 18. The outlet port 30 is provided with means for connection to the pump, such as screw threads on its outer surface. It will be appreciated that instead of using a pump to draw air out of the barrel through the outlet port 30, air may be pumped into the barrel through the air inlet port 28.

The portion of the screw 24 in the middle zone Z2 of the barrel 12, generally between the air inlet 28 and outlet 30, carries screw threads 26b of a wider pitch than the screw threads 26a in the upstream zone Z1 of the barrel 12 and the screw threads 26c in the downstream zone Z3 of the barrel 12.

In some embodiments, not shown, one of the air ports is absent and air is instead bled in or out of the barrel 12 through an aperture in the die plate 18. In some embodiments, not shown, the air outlet port may be provided by the material inlet funnel 22.

In use, the screw 24 is rotated in a conventional manner, by means not shown in the drawings. The material to be extruded is introduced into zone Z1 of the extruder barrel 12 through the material inlet funnel 22 and is mixed, compressed and moved along the extruder barrel 12 toward the die plate 18. The pitch of the screw thread 24a in the upstream zone Z1 of the barrel is such that the material 34 fills the barrel 12 in zone Z1, upstream of the air inlet port 28, as shown by the broken line in the drawing which indicates the upper surface of material 34 in the barrel. The material moves into the more widely pitched screw threads 26b in the middle zone Z2 of the barrel which move it more quickly toward the die plate 18, reducing the height of the material in the barrel, as shown by the dashed line in the drawing. When the material 34 passes into the downstream zone Z3, the more narrowly pitched screw threads 26c at or downstream of the air inlet port 28 move the material more slowly again, so that it fills the barrel 12 in zone Z3 and is extruded under pressure through the openings 20 in the die plate 18. As can be seen from the broken line in the drawing, the material 34 only partly fills the barrel 12 in the region between the air inlet port 28 and the air outlet port 30, and the air inlet and outlet ports are in fluid communication with each other; the fit between the inner surface of the barrel 12 and the threads 26 of the screw 24, although tight, permits air flow along the barrel from the inlet port 28 to the outlet port 30.

The pitch of the screw thread 26$a,b,c$ is chosen so that at the intended operating speed and throughput of the extruder, the material fills the extruder barrel 12 upstream of the air outlet port 30 and downstream of the air inlet port 28.

As shown by the arrows in the drawing, air is drawn by the pump 32 into the extruder barrel 12 through the air inlet port 28 (or in some embodiments through an aperture in the die plate 18), passes over the material 34 in the extruder barrel between the air inlet port 28 and the air outlet port 30 and is exhausted through the air outlet port (or in some embodiments through the material inlet funnel 20). This allows the air to interact with the material in the extruder barrel to dry or otherwise modify it.

The drawing shows fluid passing through the extruder barrel co current with the material being extruded. The extruder can be operated with the fluid flowing in counter current to the material. The extruder of the drawing uses a helical screw thread of varying pitch to move the material through the extruder barrel at different rates. Other means may be used to move the material at different rates. For example, a screw thread of constant pitch but with a screw axle of varying diameter may be used, so that the depth of the helical channel defined by the thread and the internal wall of the barrel varies. The axle diameter may be varied by one or more sleeves fitting around an axle of constant cross section. The material will be moved more rapidly through regions of the barrel where the axle is of relatively small diameter and more slowly through regions where the axle is of relatively large diameter.

Fluids other than air can be pumped through the extruder barrel to interact with the material therein. The fluid flow may be used to dry or otherwise modify, including chemically, the material in the extruder barrel.

The extruders of the invention find particularly application in the extrusion of chocolate crumb. The crumb ingredients, sugar, milk powder, water and cocoa mass, are introduced into the extruder with a total water content of, typically, about 5% to about 6.5% by weight. The ingredients are mixed in the extruder and the temperature is maintained below about 80° C. As the ingredients pass along the extruder barrel they are mixed and exposed to air flowing through the barrel from the air inlet port to the air outlet port. About 0.5% to about 1% absolute of the water in the crumb can be removed in the extruder. The crumb may be extruded from the extruder at about 3.5% to about 6% water by weight, reducing the drying requirement during the further processing of the crumb, although more water can be removed in the extruder reducing still further the drying after extrusion or avoiding the need for further drying altogether. For the extrusion of chocolate crumb, it is preferred that the temperature inside the extruder barrel remains below about 80° C., preferably between about 60° C. and about 75° C., and that the airflow through the extruder barrel is about 0.005 $m^3$/kg to about 0.1 $m^3$/kg of crumb passing through the extruder. This air flow can be achieved by a pump connected to the air outlet port drawing between about 600 mbar and about 900 mbar absolute pressure. The residence time of the crumb in the extruder is preferably between about 10 seconds and about 60 seconds.

The following example shows the application of the method of the invention using an extruder according to the invention.

A chocolate crumb paste having the following composition was introduced into the barrel of an extruder configured in accordance with the invention and extruded. Air was drawn through the extruder barrel by pumping air into the air inlet, as described above.

| INGREDIENT | WEIGHT % |
|---|---|
| sugar | 55 |
| skimmed milk powder | 20 |
| whey powder | 5 |
| lactose | 5 |
| cocoa mass | 10 |
| water | 5 |

The extrudate was a uniform paste containing 0.5% to 1% absolute by weight less water than in the paste introduced into the extruder.

The invention claimed is:

1. An extruder comprising: a barrel and a screw mounted in the barrel for rotation, the screw comprising screw elements and the barrel comprising: an inlet toward one end for material to be extruded and an outlet for the material toward the other end; and a fluid inlet and a fluid outlet in the barrel wall, the fluid inlet and the fluid outlet being separated along the barrel wall in the longitudinal direction thereof and the screw elements either having i) a wider pitch or ii) a screw axle of smaller diameter for that portion of the screw between the fluid inlet and the fluid outlet than both upstream and downstream of the said portion, one of the fluid inlet and the fluid outlet being connected to a pump so that there is a pressure difference between the fluid inlet and the fluid outlet, wherein the fluid outlet is closer to the material outlet than is the fluid inlet.

2. An extruder according to claim 1 in which the extruder is a twin screw extruder.

3. An extruder according to claim 1, wherein the pump is in fluid communication with the fluid inlet or the fluid outlet for passing fluid through the fluid inlet, the extruder barrel and the fluid outlet.

4. An extruder according to claim 1, further comprising a die plate at one end of the extruder barrel, one of the fluid inlet and the fluid outlet being provided by an aperture in the die plate.

* * * * *